June 22, 1965     E. LANGBERG     3,190,172
OPTICAL RESONANCE FILTERS

Filed Nov. 24, 1959     3 Sheets-Sheet 1

INVENTOR.
EDWIN LANGBERG
BY
*Thomas & Crickenberger*
ATTORNEYS

June 22, 1965   E. LANGBERG   3,190,172
OPTICAL RESONANCE FILTERS
Filed Nov. 24, 1959   3 Sheets-Sheet 2

INVENTOR.
EDWIN LANGBERG
BY
Thomas & Crickenberger
ATTORNEYS

June 22, 1965 E. LANGBERG 3,190,172
OPTICAL RESONANCE FILTERS
Filed Nov. 24, 1959 3 Sheets-Sheet 3

INVENTOR.
EDWIN LANGBERG
BY
Thomas & Crickenberger
ATTORNEYS

United States Patent Office 3,190,172
Patented June 22, 1965

3,190,172
OPTICAL RESONANCE FILTERS
Edwin Langberg, Cambridge, Mass., assignor to Elcon Laboratory, Inc., Cambridge, Mass., a corporation of Massachusetts
Filed Nov. 24, 1959, Ser. No. 855,103
9 Claims. (Cl. 88—14)

This invention relates to optical resonance detectors, and more particularly to optical resonance detectors which rely upon the scattering of resonance radiation for their mode of operation.

Present day atomic theory recognizes that a gas atom can exist only in discrete energy states. The lowest of these energy states is known as the ground state, and higher states are called excited states. Excited states are produced by the addition of energy to the atom by such means as collision with another atom, collision with an electron or the absorption of light.

In the specific case of the excitation of a gas or vapor by the absorption of light, equivalent to photon absorption, the re-emitted radiation is called resonance radiation. This process involves the excitation of atoms, by incident photons, to higher energy levels, from which they may return to the ground state or to other states. Therefore, the radiation emitted, while characteristic of the particular atom, is not necessarily of the same frequency as that of the radiation absorbed. Resonance radiation is a species of fluorescence, except that it may take place with no change in wavelength. This latter case led to the adoption of the name of resonance radiation for this phenomenon. The term resonance radiation as used here encompasses the broad meaning of the term, that is the absorption of photons of specific wavelength and the re-emission of photons of the same or other wavelengths. The process of resonance radiation is accompanied by scattering, that is the change of direction of the incoming photons and the photons re-emitted by the gas. In order to be effective, the process of resonance radiation described above must correspond to a significant absorption capability of the gas or vapor. This capability is defined in terms of the cross-section for photon absorption which for any specific gas or vapor is a function of the wavelength or energy of the incoming photons. It is found experimentally that this absorption cross-section is especially high for photon energies corresponding to the lowest excited state of the atom from which electric dipole radiation can take place. The energy of this lowest state is called the resonance energy level, and the state itself will be referred to as the resonant state of the atom.

Propagation of resonance radiation in a gas is actually a process of photon absorption and re-emission. When the energy state of an atom is increased from the ground state to the resonant state, the resonant energy level is maintained for an average period of time which is defined as the lifetime of the resonant state. After this lifetime has expired, an average atom reverts to the ground state by emitting a photon which, in turn, may be absorbed by some other atom. Since the direction of emission of these photons by the atoms in returning to their ground state is random, the propagation process is governed by the laws of diffusion and may be referred to as the scattering of resonance radiation. This phenomenon forms a basis for the operation of the present invention.

The theory discussed above has application in the field of optical filters and detectors. In one arrangement according to the invention, a transparent scattering cell containing sodium vapor is provided in conjunction with a light-sensitive detector element, such as a photocell or photo-multiplier tube. The scattering cell is positioned to receive light energy from a given source, which may be closely associated with the system, or which may be at a distance and independent of the remainder of the system. The light detector is placed in such a fashion that the direct light beam from the source cannot reach it. A particular spectral line or lines of interest emitted by the light source is absorbed from the direct light beam by the vapor or gas in the cell. The absorption of the spectral line produces a resonance radiation within the cell which diffuses throughout the gas, and is measured by the light detector means provided to give an indication of the magnitude of the light signal only in the spectral region of interest. The spectral response of the scattering cell may be broadened by the addition of an inert gas such as argon, and the center wavelength of response may be shifted by the application of an electric or a magnetic field.

This arrangement of the invention, together with modifications thereof, is illustrated in the accompanying drawings in which.

Figure 1:
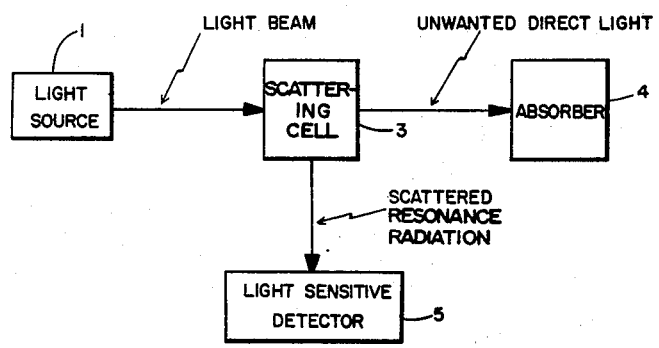
FIG. 1 is a diagrammatic view of a basic system in accordance with the invention.

Referring now to FIG. 1 of the drawings, a basic system in accordance with the invention is shown in simple block diagram form. A light source 1, which may be of white light and contain all wavelengths, or be limited to a single wavelength of interest, is arranged to shine upon a scattering cell 3. The cell 3 is optically transparent to allow the light energy from source 1 to penetrate in unimpeded fashion into the inner part of the cell. An absorber 4 is provided to absorb the unwanted direct light in cell 3. This absorber structure is preferably located within the cell 3, although it is not shown thus in the block form illustrated. Cell 3 is an hermetically sealed enclosure containing a gas or vapor with optical scattering properties to match the spectral region of interest in the light source. Vapors of alkali metals (such as sodium), iodine and mercury are particularly adaptable for use in the cell 3 because of their scattering properties. The cell can also contain a mixture of these gases or vapor having different individual responses to produce a desired combined response. Located immediately adjacent, or constructed unitarily with the scattering cell 3, is a light-sensitive detector 5. This detector may comprise any of the well known photo-sensitive elements employing the photoconductive, photoelectric or photovoltaic effects.

In operation, the gas atoms present in cell 3 are initially in their ground state. When the light energy from source 1 impinges upon the gas atoms, the atoms are excited and raised to their resonant state. After the resonant lifetime has expired, the atoms return to the ground state and in so doing emit photons of resonance energy in random directions. These emitted photons diffuse or scatter throughout the cell 3. The light-sensitive detector 5 is positioned so as not to receive any direct light from source 1, but since the scattered resonance radiation is non-directional, this light falls upon the detector 5 and serves to indicate the magnitude of the optical signal component in the resonance line which is present in light source 1. The efficiency of this adsorption and re-emission process, which may be defined as the ratio of the photons received by the detector to the resonance photons contained in the original light energy entering the cell, may be of the order of 25%. The inside of the scattering cell may contain a coating of absorbing carbon black to minimize the reflections of the light energy from source 1, and insure that the detector is measuring only the scattered resonance radition.

One possible application of the optical resonance detector is in conjunction with a light source which contains the same gas or vapor under the same conditions as the cell 3. In this case the emission spectrum of the light source matches the scattering spectrum of the cell providing for a very efficient detection of the light source combined with rejection of the rest of the spectrum. An example of such condition would be the use of a sodium light source 1 used in conjunction with a sodium vapor in cell 3. In order to make the system adaptable to different conditions, the scattering cell 3 may be standardized and made interchangeable with a number of cells containing different gases. When this is done, the characteristics of a given source may be matched readily by the simple expedient of selecting the proper scattering cell.

Figure 2:
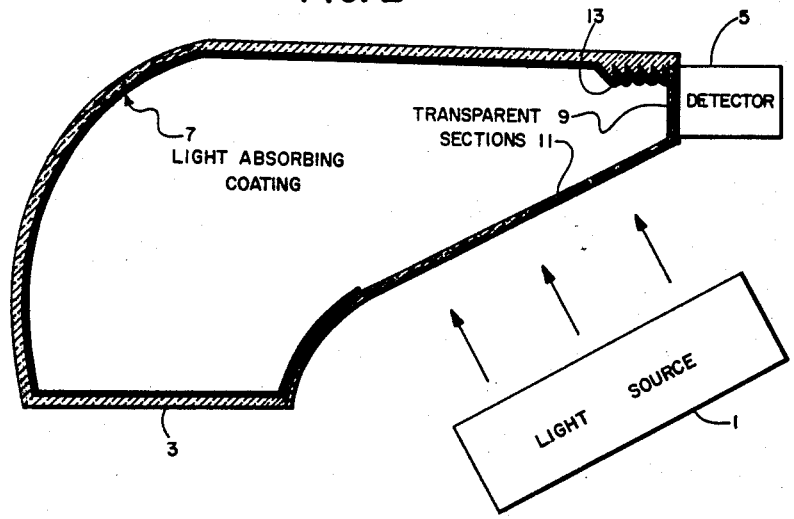
FIG. 2 is a cross-sectional view of a scattering cell for use with the present invention.

A form of a scattering cell designed especially to minimize reflections is shown in FIG. 2. The scattering cell 3, which may contain sodium vapor, is provided with a non-reflective coating 7 over all of the interior portions except transparent sections 9 and 11. Transparent section 11 is aligned with a sodium light beam 1 to permit the direct entry of light energy from source 1. Transparent section 9 has the detector element 5 mounted immediately adjacent thereto to insure that no interference from outside light sources will be encountered. In addition to this, serrations 13 are located near the detector 5 to absorb any direct light and insure that none will be reflected into detector 5.

Figure 3:
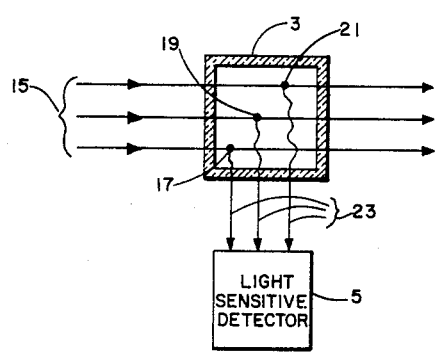
FIG. 3 is a cross-sectional view of a scattering cell showing the location of the light-sensitive detector with respect to the incoming light rays in a side-scatter filter arrangement.
Figure 4:
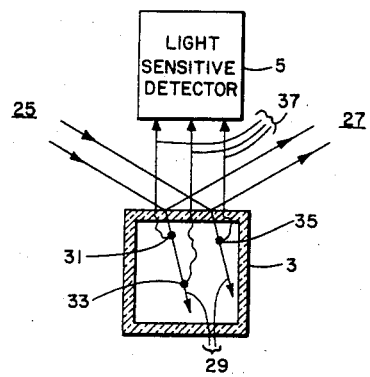
FIG. 4 is a cross-sectional view of a scattering cell showing the location of the light-sensitive detector with respect to the incoming light rays in a back-scatter filter arrangement.
Figure 5:
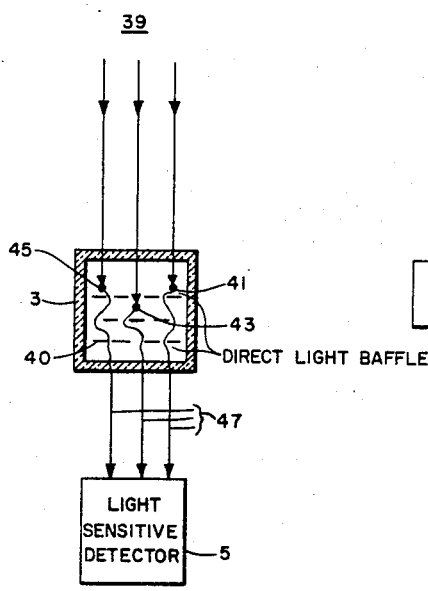
FIG. 5 is a cross-sectional view of a scattering cell showing the location of the light-sensitive detector with respect to the incoming light rays in a forward-scatter filter arrangement.

The direction of the light beam and the location of the light-sensitive detector 5 can be arranged according to the principles of operation shown in FIGS. 3 to 5, which illustrate diagrammatically side-scatter, back-scatter and forward-scatter arrangements, respectively. In the side-scatter arrangement of FIG. 3, the incident light beam 15 enters the scattering cell 3 and passes directly therethrough after energizing atoms 17, 19 and 21 to their resonant state. When these atoms are de-energized, they emit light which finds its way in random fashion to the enclosure of scattering cell 3 where it emerges as light beam 23 to fall upon detector 5. This arrangement is perhaps the most satisfactory one from the point of eliminating the influence of the direct light beam upon the detector element.

In FIG. 4, the incident beam 25 occurs at an acute angle with respect to a face of the scattering cell 3. A portion of the beam is reflected as at 27, while a portion enters the cell as at 29, striking atoms 31, 33 and 35 and energizing them to their resonant state. These atoms emit resonance radition which is scattered to the edge of scattering cell 3 where it is emitted as beam 37 to impinge upon detector 5.

In FIG. 5, the light-sensitive detector is located in line with the incoming light beam 39, but on the opposite side of scattering cell 3 therefrom. The cell contains a configuration of transparent and opaque regions which form a light baffle, generally indicated by the numeral 40, to absorb the direct light beam. Atoms 41, 43 and 45, energized by beam 39, emit photons which are scattered through the baffle and appear as light beam 47 to impinge upon light-sensitive detector 5.

Figure 6:
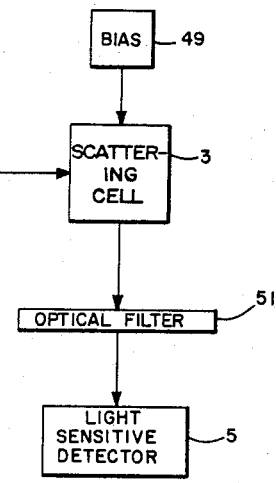
FIG. 6 is a diagrammatic view of another arrangement of the invention for measuring radiation from higher energy levels.

It is sometimes desirable to measure the radiation in the line corresponding to a higher state than the resonant state. For example, in the case of sodium vapor, the resonant states produce the D lines of emission in the visible spectrum. When it is desired to measure an infra-red line representative of a still higher state, an arrangement such as shown in FIG. 6 may be employed. The same basic elements shown in FIG. 1 are used with the addition of an optical bias device 49 and a conventional optical filter 51. The bias device 49, which is an auxiliary light source, is used to condition the atoms in the scattering cell 3 by radiating D lines which energize the atoms to their resonant state. When the atoms are in their resonant state, infra-red lines present in light source 1 will cause the atoms to be energized to the next higher state, and when they de-energize to the resonant state, they will emit infra-red radiation which is measured by the light-sensitive detector 5. An optical filter of conventional structure is interposed between the scattering cell and the light-sensitive detector 5 to filter out any light emitted at the resonant frequency of the gas atoms in cell 3. This filter 51 has a sharp cutoff characteristic falling between the resonant frequency and the frequency to be measured. The filter allows the infra-red radiation being measured to pass through to the light-sensitive detector 5, but rejects the biasing resonance radiation.

Figure 7:
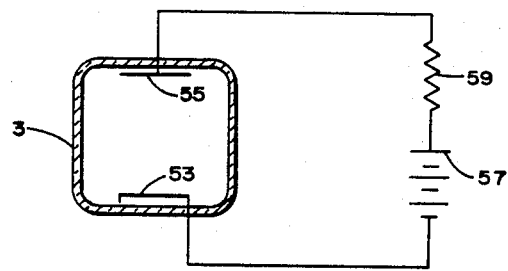
FIG. 7 is a cross-sectional view of a scattering cell employing electron biasing.

FIG. 7 shows an alternate structure for biasing the gas atoms in cell 3. The cell 3 is provided with conventional electrode structures including cathode 53 and anode 55. These electrodes are connected to a source of potential 57 through resistor 59, which is used to limit the current through the circuit. Since it is possible to excite the atomic structure of the gas atoms by electron bombardment as well as by using light rays, the electrons emitted by cathode 53 excite the atoms within scattering cell 3 while passing to plate 55. The potential applied between the electrodes will determine the energy level to which the gas atoms are excited.

Figure 8:
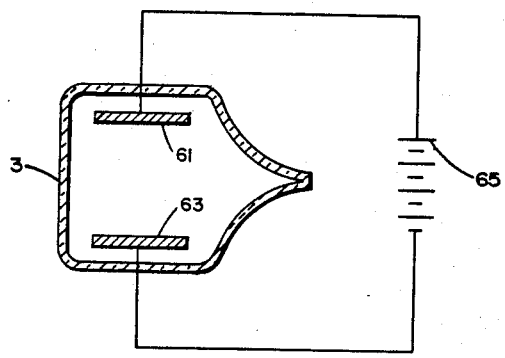
FIG. 8 is a cross-sectional view of a scattering cell having an electric field applied thereto.
Figure 9:
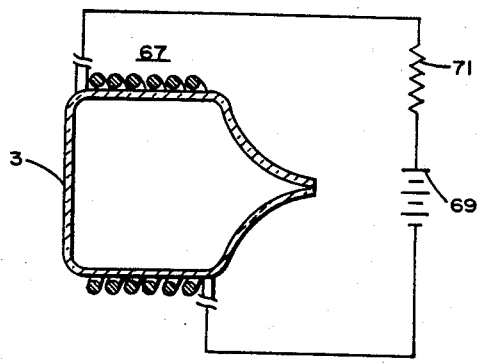
FIG. 9 is a cross-sectional view of a scattering cell having a magnetic field applied thereto.

FIGS. 8 and 9 illustrate arrangements by which the center frequency of response of the scattering cell 3 may be shifted. In FIG. 8 a pair of metallic plates 61, 63 are located on opposite sides inside the cell 3 and connected to a source of potential 65. This creates an electric field in the cell causing the spectral line of response to be split and shifted in accordance with the potential value of source 65 which determines the intensity of the electric field present in cell 3. The physical phenomenon upon which this operation is based is known as the Stark effect.

In FIG. 9 the scattering cell 3 is surrounded by a coil 67 which is energized from potential source 69 through a current limiting resistor 71. The magnetic field impressed upon the gas atoms in cell 3 by this arrangement serves to split the line and shift the line frequency of response of the device in accordance with the Zeeman effect.

The addition of an inert gas to the contents of cell 3 produces a broadening of the resonance line characteristic. By proper mixture selection, the spectral width of the gas cell can be controlled accurately. Examples of inert gases which may be used in this manner are neon and argon. A resonance filter constructed in accordance with the present invention has a spectral width one to two orders of magnitude smaller than the conventional interference filters presently in use. This is of particular importance in work in which it is desired to segregate a very narrow spectral region. The light rejection is also substantially higher, being as low as one millionth of the total light intensity.

While the invention has been illustrated and described in certain arrangements, it is recognized that variations and changes may be made therein without departing from the invention as set forth in the claims.

What is claimed is:

1. Apparatus for filtering a narrow band of optical energy comprising, in combination, means forming a gas tight enclosure, a gas contained within said enclosure, said gas exhibiting resonance scattering in the band of optical energy it is desired to filter when the molecules of said gas are in an excited state, said enclosure including an optically transparent surface, through which optical enery to be filtered may enter said gas, means for exciting at least a portion of the atoms of said gas to said excited state, said excited state corresponding to an energy level higher than the ground state of said atoms, means responsive to the resonance radiation in the band of optical energy to be filtered which is emitted and scattered by said gas following absorption of energy to be filtered, said enclosure being non-resonant to the radiation emitted and scattered by said gas, said resonance radiation being of a frequency which lies within the band of frequencies occupied by the optical energy to be filtered and said radiation responsive means being shielded from direct radiation entering said transparent surface.

2. The combination defined in claim 1 in which said means for exciting the atoms of said gas includes an anode electrode in said cell, a cathode electrode in said cell, and means applying a potential difference between said anode and said cathode, said gas atoms being excited by electrons passing between said cathode and said anode.

3. The combination defined in claim 1 in which said means for exciting the atoms of said gas includes a light source positioned to illuminate said gas, said source emitting radiation of a wavelength to cause said gas atoms to change from their ground state to an excited state.

4. The combination defined in claim 1 which includes means for subjecting the gas in said cell to a magnetic field, thereby to shift the center wavelength of the response band of said apparatus.

5. The combination defined in claim 1 which includes means for subjecting the gas in said cell to an electrostatic field thereby to shift the center wavelength of the response band of said apparatus.

6. The combination defined in claim 1 in which said enclosure contains at least two gases, a first of said gases exhibiting resonance scattering in the band of optical energy it is desired to detect, and the second of said gases causing a broadening of the resonance scattering line of said first gas as compared to said first gas in the absence of said second gas.

7. The combination defined in claim 1 in which said gas is an alkali metal vapor.

8. The combination defined in claim 1 in which said gas is mercury vapor.

9. Apparatus for filtering a narrow band of optical energy comprising, in combination, means forming a gas tight enclosure, a gas contained within said enclosure, said gas exhibiting resonance scattering in the band of optical energy it is desired to filter when the molecules of said gas are in an excited state, said enclosure including an optically transparent surface through which optical energy may enter said gas, an anode electrode in said cell, a cathode electrode in said cell and means applying a potential difference between said anode and cathode, the atoms of said gas being raised to an excited state by electrons passing between said anode and cathode, said excited state corresponding to an energy level higher than the ground state of said atoms, means for subjecting the gas in said cell to a magnetic field, thereby to shift the center wavelength of the response band of said apparatus, and means responsive to the resonance radiation in the band of optical energy which is to be filtered and which is emitted and scattered by said gas following absorption of energy to be filtered, said enclosure being non-resonant to the radiation emitted and scattered by said gas, and said radiation responsive means being shielded from direct radiation entering said transparent surface.

References Cited by the Examiner

UNITED STATES PATENTS

| 2,527,122 | 10/50 | Heigl et al. | 88—14 |
| 2,836,722 | 5/58 | Dicke et al. | 331—94 |
| 2,925,007 | 2/60 | Silver | 88—14 |
| 2,929,922 | 3/60 | Schawlow et al. | 88—61 |
| 2,971,429 | 2/61 | Howerton | 88—14 |
| 3,070,698 | 12/62 | Bloembergen | 250—83.3 |
| 3,098,112 | 7/63 | Horton | 88—1 |

OTHER REFERENCES

Wood, R. W.: Physical Optics, 3rd ed., 1934, The Macmillan Company, New York, pages 587–647.

JEWELL H. PEDERSEN, *Primary Examiner.*

EMIL G. ANDERSON, *Examiner.*

UNITED STATES PATENT OFFICE
CERTIFICATE OF CORRECTION

Patent No. 3,190,172                                               June 22, 1965

Edwin Langberg

It is hereby certified that error appears in the above numbered patent requiring correction and that the said Letters Patent should read as corrected below.

Column 2, line 63, for "vapor" read -- vapors --; column 5, lines 12 and 13, for "enery" read -- energy --.

Signed and sealed this 18th day of January 1966.

(SEAL)
Attest:

ERNEST W. SWIDER                                       EDWARD J. BRENNER
Attesting Officer                                          Commissioner of Patents